(No Model.)

W. J. BENNING.
WATER MOTOR.

No. 583,007. Patented May 18, 1897.

Witnesses:
W. J. Zansley
S. C. Sweek

Inventor: William J. Benning,
By Thomas G. Orwig, Attorney

UNITED STATES PATENT OFFICE.

WILLIAM J. BENNING, OF BOONE, IOWA.

WATER-MOTOR.

SPECIFICATION forming part of Letters Patent No. 583,007, dated May 18, 1897.

Application filed August 10, 1895. Serial No. 558,950. (No model.)

*To all whom it may concern:*

Be it known that I, WILLIAM J. BENNING, a citizen of the United States of America, residing at Boone, in the county of Boone and State of Iowa, have invented a new and useful Water-Motor, of which the following is a specification.

The object of this invention is to utilize water currents in open watercourses for the propulsion of mechanism.

My object is to combine water-wheels with floats in such a manner that they can be readily adjusted relative to each other and a current of water as required to be subjected to uniform force and to rotate with uniform speed and to independently transmit power to a single shaft to unite their power therewith for the purpose of operating extraneous machinery.

Figure 1:
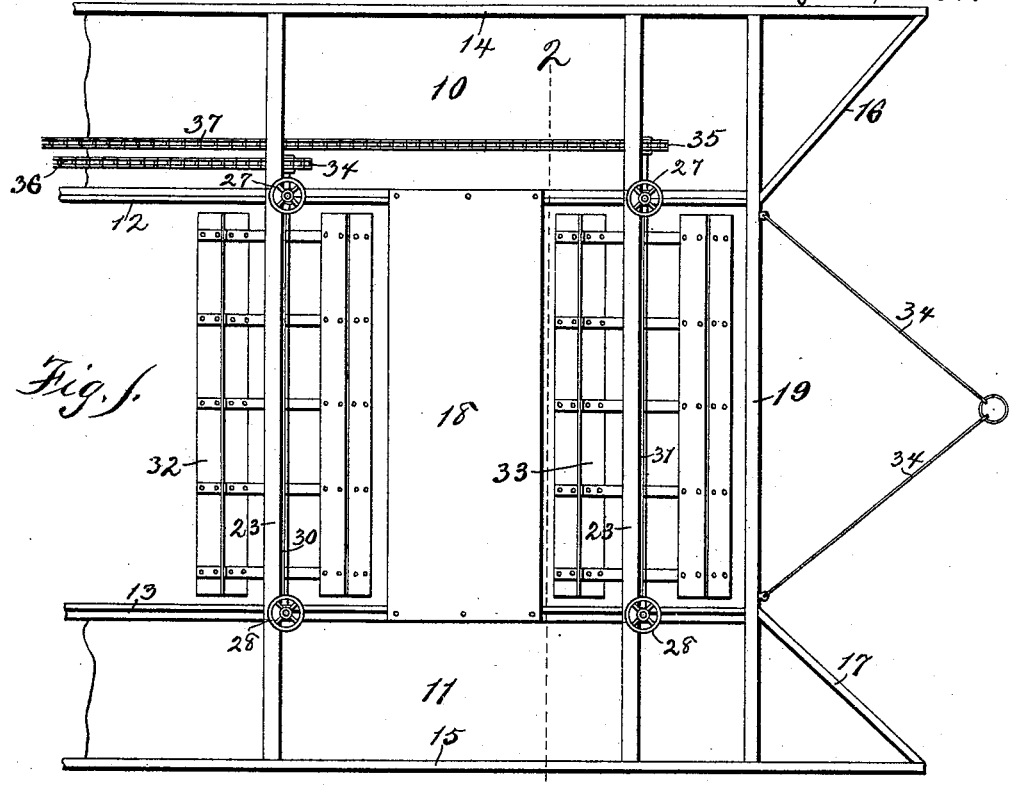
Figure 2:
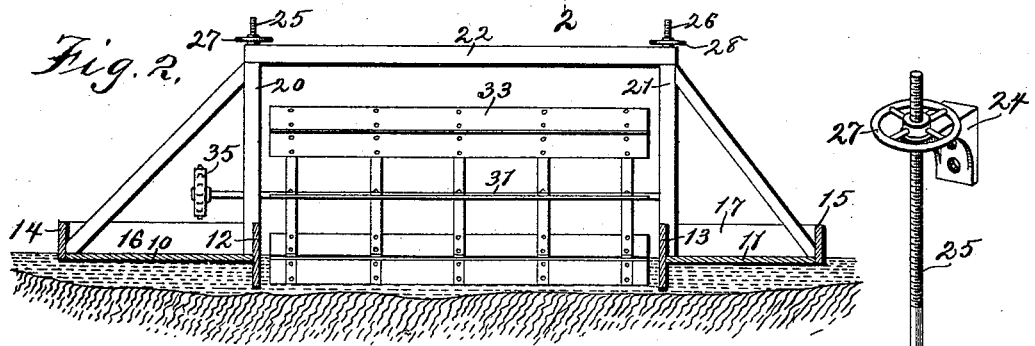
Figure 3:
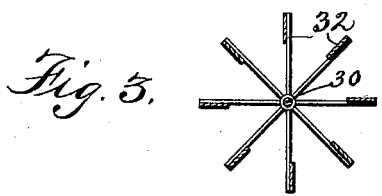
Figure 4:

Figure 1 is a plan of my motor. Fig. 2 is a sectional elevation of the motor on the indicated line 2 2 of Fig. 1. Fig. 3 is a detail sectional elevation of one of the paddle-wheels. Fig. 4 is a detail perspective of an adjustable bearing for the paddle-wheel.

In the construction of the apparatus, as shown, the numerals 10 11 designate floats, having bottoms, inner side pieces 12 13, outer side pieces 14 15, and forward ends 16 17, rigidly connected. The inner side pieces 12 13 project below the bottoms of the floats, as do also the end pieces 16 17. The end pieces 16 17 are arranged obliquely of the floats and in convergent planes intersecting midway between the floats. Provision is thus made for converging a maximum quantity of water between the floats, and the boards 12 and 13 at the inner edge of the floats are adapted to serve as centering-boards to aid in keeping the complete structure level when stationary or when moving about, as contemplated. I am aware boards at both sides of floats and also at the ends have extended downward below the floor to produce chambers, but not for the purpose of serving as centering-boards. The inner side pieces 12 13 of the floats are connected by a run-board 18, and the forward ends of said floats are rigidly connected by a bar 19. Standards 20 21 are rigidly connected to the inner side pieces 12 13 of the floats and extend vertically therefrom in pairs. The upper ends of the standards 20 21 are connected in pairs by cross-bars 22 23. Angle-plates 24 are mounted on and project forward from the upper end portion of the standards 20 21, which angle-plates are apertured in vertical planes in their horizontal portions. Hanger-bars 25 26 are mounted in vertical positions in the apertures in the angle-plates 24, which hanger-bars are screw-threaded at their upper end portions and retained against downward movement by adjusting-wheels 27 28, interiorly screw-threaded and seated on the hanger-bar in engagement with the upper faces of the angle-plates 24. The lower end portions of the hanger-bars 25 26 are bifurcated, and stirrups 29 are mounted in the bifurcations thereof. Shafts 30 31 are mounted for rotation in and supported at the ends by the stirrups 29, and paddle-wheels 32 33 are rigidly mounted on said shafts and project downwardly approximately to the lower edges of the side pieces 12 13. Sprocket-wheels 34 35 are mounted on the outer ends of the shafts 30 31, and sprocket-chains 36 37 connect said sprocket-wheels to the mechanism to be driven. (Not shown.) It will be observed that the shafts 30 31 have a limited vertical movement in the stirrups 29, thus providing for freedom of action of said shafts. The stirrups 29 rest against the standards 20 21 and are held thereby against rearward movement, while at the same time they allow flexion to the hanger-bars relative to the stirrups and journals of the wheels in the stirrups as required to relieve the wheels from strain from impact with undue resisting force. In the event of the engagement of either paddle-wheel by a log or other object carried by the current said wheel will yield upwardly and move the hanger-bars 25 26 through the angle-plates 24 and automatically reseat when the obstruction has passed. The angle-plates also allow restricted flexion to the bars 25 as required to accommodate the wheels in adjusting themselves to undue impact of the current or obstructing objects that may come in contact with the wheels.

Draft-cables 34 are connected to the forward ends of the floats 10 11, by means of which the motor may be anchored or transported.

The mechanism to be driven may be mounted on one or both of the floats, if desired, and driven by the direct action of the motor.

An electric generator may be carried on the floats geared to the shafts 30 31 and the resultant energy conducted to the shore by wires.

I do not desire to limit myself to the employment of one or two paddle-wheels in the apparatus, but to extend the number of said wheels indefinitely, as may be found expedient for the production of sufficient power.

The inner sides of the floats may extend below the bottoms thereof to any desired extent to retain the maximum quantity of current which is deflected by the forward ends 16 17.

In the practical operation of my invention the parallel floats may be utilized for supporting and carrying persons and freight, when desired, by elevating the wheels above the surface of the water whenever it is desirable to change the location of the motor. The downwardly-extending side pieces 12 and 13 serve as centering-boards in keeping the complete device level while stationary or when moving in the water. They also prevent the current of water that passes between them from spreading, and thus aid in applying the current to the wheels that extend from one float to the other. The stirrups 29 allow a restricted vertical motion to the wheels, as required when the floats are moved and the wheels pass over obstructions in the line of advance, and by means of the stirrups and adjustable hanger-bars 25 the front wheel can be readily maintained at a higher elevation than the wheel in rear of it, so that the impact of the water upon the two wheels will be equalized by diminishing the area of surface of the wheel exposed to the water in the front wheel.

It is obvious that when two or more wheels are in the same current the force of the current is stronger when it engages the front wheel than it is when, after being impeded by the front wheel, it engages the next wheel in rear of the forward wheel. A series of wheels can be thus readily adjusted relative to each other and the surface of the water by means of the elevating devices in view of the fact that the shaft of each wheel is independently connected with a driving-shaft by means of sprocket wheel and chains in such a manner that the power of each wheel will be delivered to a single driving-shaft and the joint force thus collected from a series of water-wheels utilized for operating extraneous machinery on the floats or located on the shore of the stream in which the floats are anchored.

I claim as my invention—

1. In a current-motor, the combination of straight hanger-bars, screw-threaded at their upper portions and bifurcated at their lower ends, stirrups adapted to support the rotating shaft of a water-wheel pivoted in the said bifurcated ends of said bars, angle-irons fixed to a frame, the hanger-bars extended upward through said angle-irons and hand-wheels fitted on the top end portions of the hanger-bars, for the purposes stated.

2. A current-motor comprising two floats each having a side board or centering-board extending longitudinally and also downwardly at its inside edge, a frame rigidly connecting the two floats in parallel position, vertically-adjustable hanger-bars having bifurcated lower ends and stirrups pivoted in said ends for supporting the shafts of water-wheels, angle-irons fixed to said frame and the top ends of the hanger-bars extended up through said irons, hand-wheels fitted to said ends of the hanger-bars, two or more water-wheels adjustably suspended between the floats by means of said hanger-bars, a sprocket-wheel on the end of the shaft of each water-wheel and a sprocket-chain on each of said sprocket-wheels adapted to be connected with a driving-shaft, all arranged and combined to operate in the manner set forth, for the purposes stated.

WILLIAM J. BENNING.

Witnesses:
W. W. GOODYKOONTZ,
R. F. JORDAN.